(12) United States Patent
Drivon et al.

(10) Patent No.: US 11,619,330 B2
(45) Date of Patent: Apr. 4, 2023

(54) CLAMPING COLLAR WITH RETAINING FINGERS

(71) Applicant: CAILLAU, Issy-les-Moulineaux (FR)

(72) Inventors: Stéphane Drivon, Romorantin (FR); Fabrice Prevot, Selles sur Cher (FR)

( * ) Notice: Subject to any disclaimer, the term of this patent is extended or adjusted under 35 U.S.C. 154(b) by 164 days.

(21) Appl. No.: 16/920,495

(22) Filed: Jul. 3, 2020

(65) Prior Publication Data
US 2021/0018121 A1    Jan. 21, 2021

(30) Foreign Application Priority Data
Jul. 15, 2019   (FR) ...................................... 19 07954

(51) Int. Cl.
*F16L 23/08* (2006.01)
*F16L 23/00* (2006.01)

(52) U.S. Cl.
CPC ............. *F16L 23/003* (2013.01); *F16L 23/08* (2013.01); *F16B 2200/509* (2018.08)

(58) Field of Classification Search
CPC ....... F16L 23/003; F16L 23/006; F16L 23/04; F16L 23/08; F16L 23/16; F16L 23/12; F16B 2200/509
See application file for complete search history.

(56) References Cited

U.S. PATENT DOCUMENTS

| | | | |
|---|---|---|---|
| 5,782,499 A | * | 7/1998 | Gfrerer .................... F16L 23/08 285/23 |
| 7,399,005 B2 | | 7/2008 | Rigollet et al. |
| 9,016,731 B2 | * | 4/2015 | Rigollet ................ F16L 23/003 285/334.5 |
| 10,228,084 B2 | | 3/2019 | Vosgeois et al. |

FOREIGN PATENT DOCUMENTS

| | | |
|---|---|---|
| EP | 1451498 B1 | 3/2006 |
| EP | 2598785 B1 | 9/2015 |
| EP | 3217059 B1 | 9/2017 |

* cited by examiner

*Primary Examiner* — Aaron M Dunwoody
(74) *Attorney, Agent, or Firm* — Brian Gordaychik

(57) ABSTRACT

A clamping system for connecting a first and a second tube whose opposite ends have clamping surfaces protruding from the cylindrical outer surface of said tubes. The system comprises a collar which comprises a belt able to be clamped around said clamping surfaces, the belt having a first and a second flank between which an internal recess able to receive the clamping surfaces is delimited. The collar carries at least one retaining finger which has a free end portion protruding axially beyond the edge of the first flank, said free end portion having a retaining edge configured to be retained outside the belt by a radially protruding element.

15 Claims, 4 Drawing Sheets

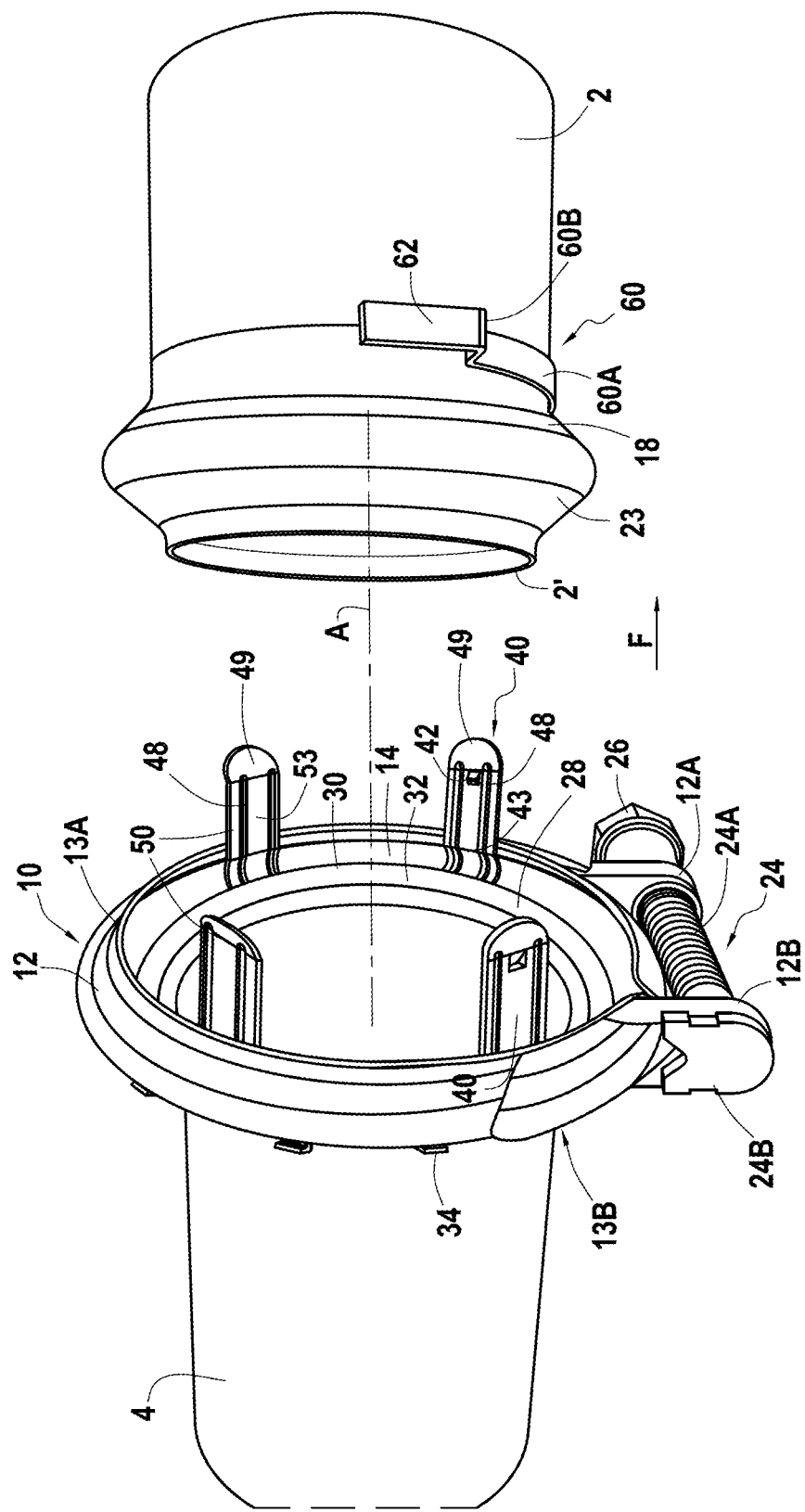
[Fig. 1]

[Fig. 2]
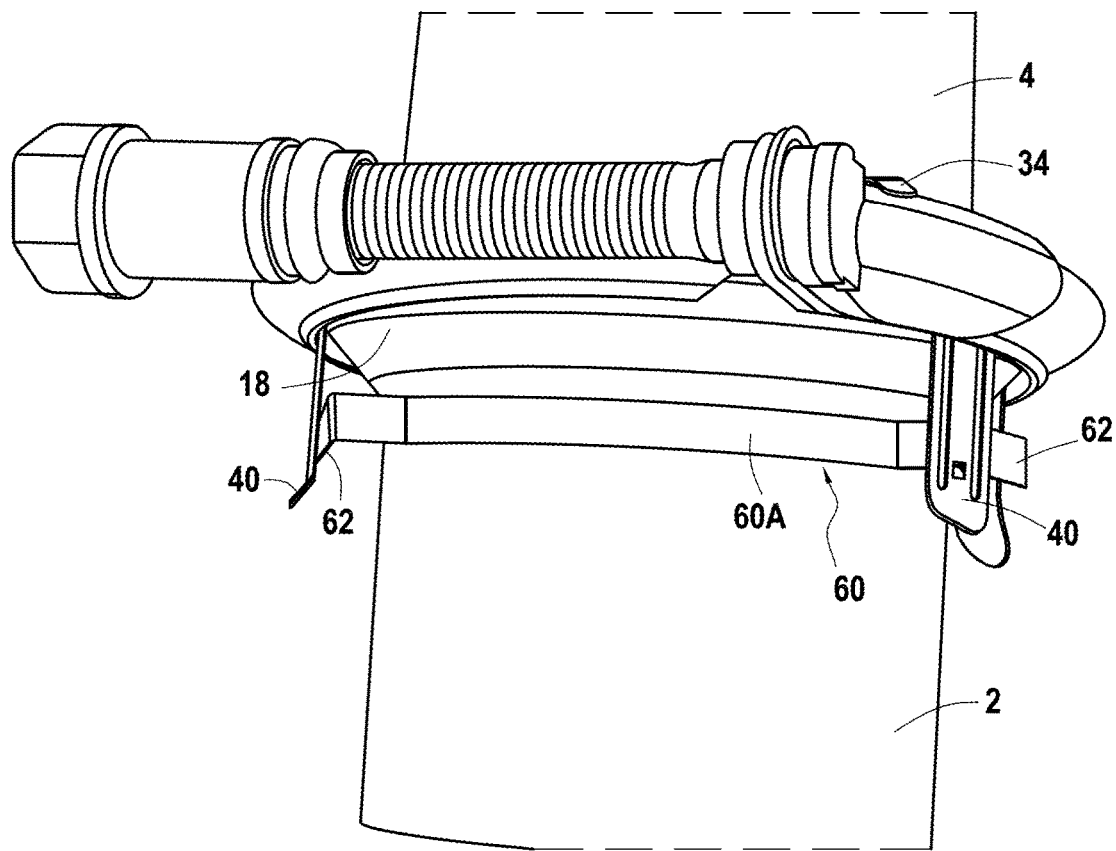
[Fig. 3]
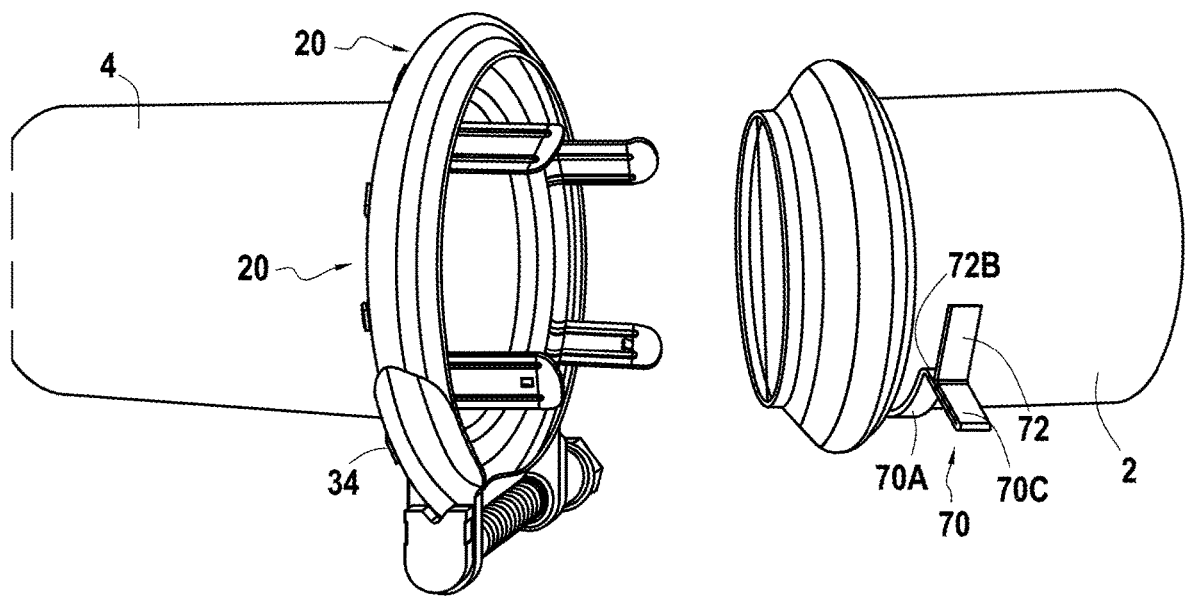

[Fig. 4]
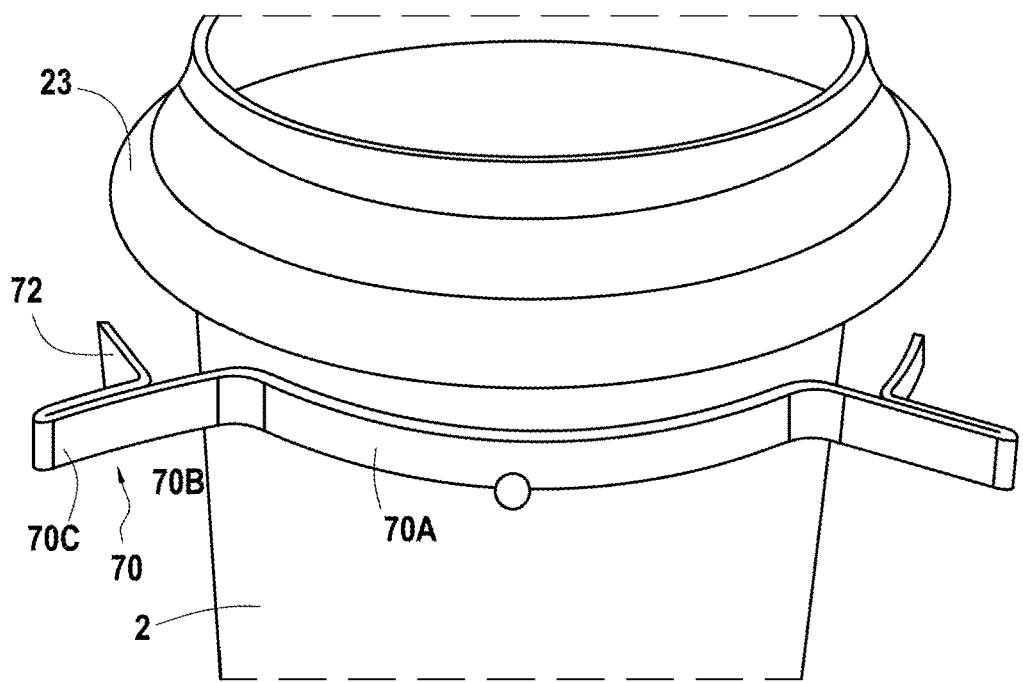
[Fig. 5]
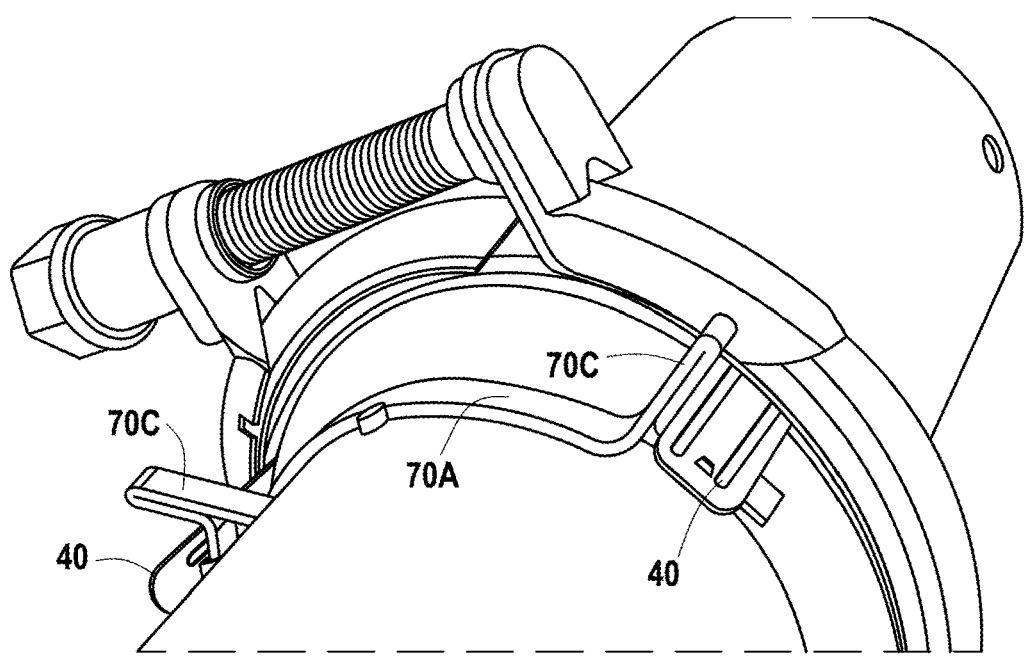

[Fig. 6A]
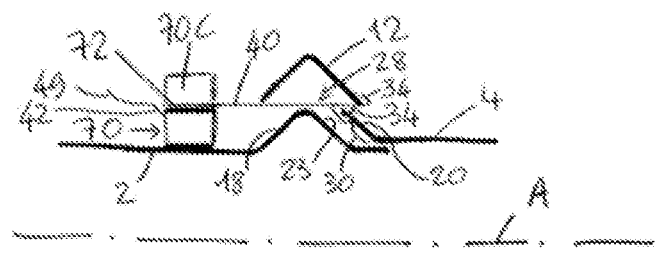
[Fig. 6B]
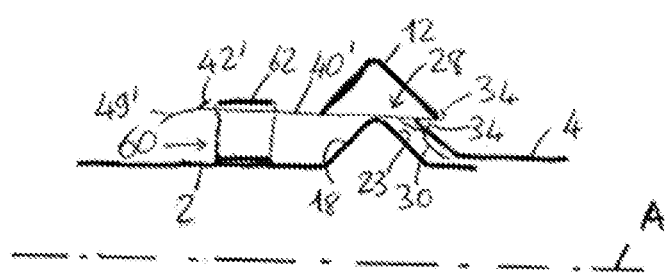

CLAMPING COLLAR WITH RETAINING FINGERS

BACKGROUND

The present disclosure relates to a clamping system for connecting a first and a second tube whose opposite ends have clamping surfaces protruding from the cylindrical outer surface of said tubes.

A clamping system of this type is known, for example from European patents EP 1 4514 498 and EP 2 598 785.

In such a system, the collar comprises a belt able to be clamped around the clamping surfaces of the tubes. The belt has flanks between which an internal recess is delimited in which the clamping surfaces of the tubes are disposed to carry out the clamping. The tubes are thus retained clamped relative to each other. As indicated in the aforementioned patents, it may be useful to pre-mount the clamping system on the end of at least one of the tubes before carrying out the clamping.

In order to allow a pre-mounting on the two tubes, EP 2 598 785 recommends that the clamping system comprise a washer, retained relative to the collar by fastening lugs, and comprising first and second pre-mounting lugs able to respectively cooperate with the first and the second tube to retain the washer, and therefore the entire clamping system, relative to the respective clamping surfaces of the tubes before the clamping. These pre-mounting lugs in this case comprise short lugs extending back above the frustoconical annular shape of the washer to cooperate with the clamping surface of the tube whose clamping surface is disposed between the belt and the washer. These pre-mounting lugs also include long lugs, which extend from the top of the washer in the opposite direction to the washer to cooperate with the clamping surface of the other tube.

In EP 2 598 785, the lugs of these two categories are elastically deformable. This device is generally satisfactory, but, for some applications, it is important to improve reliability of the retention of the lugs relative to the clamping surfaces, particularly as regards the long lugs. Indeed, concerning particularly long lugs, it may be difficult to ensure the right range of elastic deformation for some clamping diameters, particularly large diameters on the order of 5 cm or more. On the one hand, it is necessary to ensure that the modulus of elasticity of these lugs is sufficiently high so that they have the desirable elasticity for elastically recovering, after having been deformed upon engagement of the tube in the clamping system, a position ensuring the pre-mounted retention of this tube. They must then have the elastic responsiveness necessary in order not to be too easily deformed if traction is exerted on the tube in the direction of its disengagement from the clamping system. However, this elastic retention is useful only in the pre-mounted state, before the clamping. In the clamped state, it is on the contrary desirable that the lugs are deformed to be pressed inside the belt of the collar, without affecting the quality of the clamping. However, if the elastic modulus of the lugs is high, this latter property may be difficult to achieve in some cases, particularly for large-diameter collars. In addition, if the elastic modulus is too high, the engagement pushing force required for the clipping of the lugs on the clamping surface of the tube can be high, and difficult to achieve in a context of final mounting.

Thus, even though the system of EP 2 598 785 is satisfactory for a large number of applications, it is desirable to propose another solution allowing pre-mounting of the clamping system at the end of the first tube substantially free from the aforementioned drawbacks, particularly for the large-diameter collars.

EP 1 451 498 proposes a system allowing a pre-mounting relative to a tube, using pre-mounting lugs also carried by the belt via a washer itself carried by the belt. The same problems as those mentioned above can arise for a pre-mounting relative to a single tube.

Other clamping systems are also known comprising a collar and a washer carried by the collar, the washer having internal lugs, able to grip inside one of the tubes, for pre-mounting the clamping system at the end of this tube. It may be useful to complete this system to also allow a pre-mounting relative to the other tube. For that, it is possible to use the long lugs proposed by EP 2 598 785 but, particularly for large-diameter collars, there is a need for another solution, substantially free from the abovementioned drawbacks.

SUMMARY

Generally, there is a need for a clamping system allowing controlled retention in the pre-mounted state relative to the clamping surface of one of the tubes it is intended to clamp.

Thus, the disclosure relates to a clamping system for connecting a first and a second tube whose opposite ends have clamping surfaces protruding from the cylindrical outer surface of said tubes, the system comprising a collar which comprises a belt able to be clamped around said clamping surfaces, the belt having a first and a second flank between which an internal recess able to receive the clamping surfaces is delimited, the collar carrying at least one retaining finger, which has a free end portion protruding axially beyond the edge of the first flank, said free end portion having a retaining edge configured to be retained outside the belt by a radially protruding element.

Thus, the retaining finger is naturally on standby to cooperate, when the first tube is fitted into the clamping system, with an element radially protruding therefrom. The implementation of the retention therefore does not require any particular manipulation once the first tube has been fitted into the clamping system.

Optionally, the clamping system comprises centering surfaces located axially outside the edge of the first flank.

Optionally, the centering surfaces comprise at least one centering surface formed on the retaining finger.

Optionally, the collar carries at least one centering finger protruding axially beyond the edge of the first flank and in which the centering surfaces comprise at least one centering surface formed on the centering finger.

Optionally, the retaining finger has a ramp at the end of its free end portion.

Optionally, the retaining finger has at least one reinforcing rib.

Optionally, the centering finger has a ramp at the end of its free end portion.

Optionally, the centering finger has at least one reinforcing rib.

Optionally, the clamping system comprises a washer supported by the collar, the washer comprising an annular part disposed inside the belt and carrying the retaining finger.

Optionally, the washer also carries the centering finger.

Optionally, the retaining edge is formed on a pin cut out in the retaining finger and deformed radially.

The disclosure also relates to a clamping system according to the disclosure and a first tube having, in the vicinity of its free end, a clamping surface protruding from its cylindrical outer surface, the first tube further having a retaining protrusion located on the other side of its clamping surface relative to its free end, the retaining edge cooperating with said retaining protrusion when the first tube is fitted into the collar.

Optionally, the retaining protrusion is formed on a transverse blade which has a fastening portion through which it is fastened to the first tube, and a retaining portion, straightened radially relative to the fastening portion.

Optionally, the blade has two retaining portions and the collar carries two retaining fingers configured to cooperate with said retaining portions.

Optionally, the retaining protrusion is configured to define an angular wedging of the clamping system relative to the first tube.

Optionally, the blade has two shoulders forming a radial stop for the retaining fingers.

The present disclosure will be clearly understood and its advantages will appear better upon reading the following detailed description of one embodiment represented by way of non-limiting example.

BRIEF DESCRIPTION OF THE DRAWINGS

FIG. 1 is a perspective view of an assembly comprising a clamping system according to the present disclosure and two tubes.

FIG. 2 shows in side view of the two pre-assembled tubes thanks to the clamping system.

FIG. 3 is a view similar to FIG. 1, showing a variant.

FIG. 4 shows the first tube adapted to this variant.

FIG. 5 is a detailed view showing the situation in which the two tubes are pre-assembled using the clamping system according to this variant.

FIG. 6A is a schematic view in half-section taken in a plane containing a retaining finger of FIG. 5, this plane being defined by the axis A and a diameter of the belt passing through the retaining finger.

FIG. 6B is a view similar to FIG. 6A, for a variant.

DETAILED DESCRIPTION

FIGS. 1 and 2 are described at first. It can be seen in these figures that the clamping system comprises a collar 10, of the same type as the one described in EP 2 598 785 and a washer 28, which cooperate to assemble two tubes 2, 4.

In the following, "radially internal" elements will refer to the elements that are directed towards the axis A of the two tubes placed end to end and that are closest to this axis A relative to other elements referred to as "radially external" elements, the "radially external" elements also being those that are directed away from the axis A. It is also considered that the axis A of the two tubes is also the axis of the collar, more specifically the axis of the collar belt, the latter being wound on itself.

Furthermore, it will be considered that a second element is "external" or "axially external" to a first element, if the second element is located next to the first one, that is to say outside the axial slice occupied by the first element.

The collar comprises a belt 12 which delimits a recess 14 in which the bearing surfaces, respectively 18 belonging to the first tube 2 and 20 belonging to the second tube 4 can be inserted. This recess and these bearing surfaces have shapes such that the clamping of the belt of the collar forces the ends of the tubes 2 and 4 to come close to each other. The recess 14 is delimited between a first and a second flank 13A and 13B of the belt 12, these flanks defining in this case the branches of a V seen in axial section. Thus, the belt 12 has an advantageously V-shaped axial section, while the bearing surfaces 18 and 20 have a diameter which increases progressively towards the opposite free ends of the tubes and have for example a frustoconical shape.

The belt 12 has ends respectively 12A and 12B, which are straightened substantially radially so as to form bearing lugs. These lugs are pierced so as to allow the passage of the rod 24A of a clamping screw 24 through these lugs. The head 24B of the screw is wedged relative to one of the bearing lugs, in this case the lug 12B, while a nut 26 is retained relative to the other bearing lug 12A. It is understood that the rotation of the nut in the direction of screwing brings the bearing lugs closer to each other and therefore reduces the inner diameter of the collar, that is to say it allows clamping the strip. Of course, other ways of clamping the strip can be envisaged, for example hooking systems, as described in particular in patent application FR 3 008 160.

The clamping system comprises a washer 28 which is secured to the collar. The washer may particularly be of the type described in EP 1 451 498.

This washer 28 has a frustoconical annular portion 30 which can be inserted between the opposite ends of the two tubes 2 and 4 when they are engaged in the clamping system. Indeed, the washer 28 is retained relative to the belt, in this case relative to its second flank 13B, by fastening lugs so that an annular space is arranged between the second flank and the washer. The free end of the second tube 4 carrying its bearing surface 20 is inserted into this annular space inside the recess 14, while the free end of the first tube 2 carrying its bearing surface 18 is inserted on the opposite side of the annular space relative to the washer, that is to say against the internal face of the frustoconical portion 30 of the washer 28.

In this case, the end of the tube 4 is a female flared part, the internal periphery of its bearing surface 20 forming a flared part. On the other hand, the free end of the first tube 2 is a male end which, beyond its bearing surface 18, has an outer periphery 23 whose diameter gradually decreases towards the termination of the free end. The end part 23 thus formed can therefore be inserted, substantially in a form-fitting manner, inside the flared part formed at the end of the tube 4. The frustoconical annular portion 30 of the washer 28 may have annular deformations 32 forming a seal between the internal surface of the flared part 19 and the external periphery 23.

The fastening of the washer 28 of the collar 10 and/or the pre-mounting of the clamping system comprising the collar and the washer on the tube 4 can be ensured in the same way as in EP 1 451 498, by fastening lugs and/or pre-mounting lugs 34 with which the washer is equipped, these lugs serving to hook the washer on the second flank 13B of the belt, while arranging the abovementioned annular space, as described in EP 1 451 498.

Other modes of fastening the washer to the collar can be used. For example, the washer may have a retaining loop in which the shank of the screw 24 can be engaged, as well as one or several retaining lugs which can be retained on the edge of the belt, for example by hooking or by pinching. Likewise, other modes of pre-mounting the clamping system relative to the tube 4 can be used, for example, by equipping the washer with internal lugs or studs engaged in the tube 4 to cling on the internal surface of the tube 4.

The collar carries retaining fingers 40 that have free end portions protruding axially beyond the edge of the first flank 13A. For each retaining finger, the free end portion has a retaining edge 42 configured to be retained outside the belt by a radially protruding element. As will be seen below, this radially protruding element is particularly a retaining protrusion secured to the first tube 2. The internal surfaces 43 of the common portions of the retaining fingers form centering surfaces that extend axially beyond the edge of the first flank 13A, while being radially comprised in the diametrical dimensions of this edge. Considered together, the different centering surfaces define diametrical dimensions comparable to those defined by the top of the clamping surface 18 of the first tube 2, so as to carry out a centering of this first tube upon its insertion into the clamping system. It is seen that the collar also carries centering fingers 50 that are similar to the retaining fingers, except that they do not have a retaining edge. However, as for the retaining fingers, their internal surfaces 53 form centering surfaces. It can be seen that the retaining fingers and the centering fingers have ribs 48 that are oriented axially and that stiffen these fingers. Thus, the retaining fingers and the centering fingers have a radial responsiveness, that is to say they are relatively not very flexible and can be elastically deformed radially over a small radial displacement by having a strong tendency to elastic return. The retaining fingers and the centering fingers also have flared ramps 49 at the end of their free ends. These flared ramps promote the insertion of the first tube into the clamping system.

In this case, the retaining fingers 40 and the centering fingers 50 are carried by the washer 28 which is itself supported by the collar 10 as indicated. More specifically, the retaining fingers and the centering fingers are carried by the annular part 30, in this case frustoconical annular part, of the washer which is disposed inside the belt 12 of the collar. The retaining fingers and the centering fingers extend forwardly from the front edge of this annular part. Within the meaning of the present disclosure, the forward direction is the one which goes from the second flank 13B toward the first flank 13A. Thus, the retaining fingers and the centering fingers extend forwardly beyond the front edge of the flank 13A. The forward direction is indicated by the arrow F in FIG. 1. In the unclamped state of the collar, the retaining fingers and the centering fingers can extend substantially axially forwardly from the front edge of the annular part 30 of the washer 28. Particularly, at least in their common portions between their ends, they can extend parallel to the axis A. They can, however, in their part of attachment to the washer 28, be slightly corrugated radially outwardly to get closer to the bottom of the recess 14 of the belt 12. In addition, the reinforcing ribs can start only at a short distance from the connection of the retaining fingers and the centering fingers to the washer, so as to allow a certain flexibility in this connection portion between the lugs and the washer, while ensuring the responsiveness mentioned previously, it being noted that the radially external faces of the fingers can cooperate with the edge of the first flank to contribute to the elastic return of these fingers radially inwardly. It is understood that, upon clamping of the collar, while the two tubes are connected, these parts for connecting the fingers to the washer are deformed by being pressed against the bottom of the recess by the clamping surface 18.

As seen in FIGS. 1 and 2, the first tube has a retaining protrusion 62 which is radially protruding on its outer surface and which is located on the other side of the clamping surface 18 relative to the free end 2' of this first tube 2. More specifically, the retaining protrusion 62 is formed on a transverse blade 60 which has a fastening portion 60A through which it is fastened to the first tube, and a retaining portion which forms the retaining protrusion 62 and which is straightened radially relative to the fastening portion 60A. Indeed, the fastening portion is connected to the retaining portion by a step 60B. In this case, the transverse blade 60 has the shape of a flat blade whose thickness is measured radially and whose width is measured parallel to the axis A of the collar. More specifically, in the example represented, the transverse blade has two similar retaining portions 62 which, in this case, are disposed at its two ends between which its fastening portion 60A extends.

It can be seen in FIG. 2 that each of the two retaining fingers 40 cooperates, through its retaining pin 42, with one of these retaining portions 62. In FIG. 2, the two tubes are pre-assembled, the clamping system being both pre-mounted at the end of the second tube 4 and at the end of the first tube 2. In this situation, it suffices to clamp the collar to finalize the assembly of the two tubes. In doing so, as indicated above, the retaining and centering lugs deform under the effect of the clamping without hampering the latter.

With reference to FIGS. 3 to 5, a variant will now be described. The clamping system itself is unchanged compared to that of FIGS. 1 to 2. What changes in this variant is the fact that the system, combined with the first tube, allows an angular wedging of the clamping system relative to this first tube. Indeed, the transverse blade 70 carried by the first tube 2 and on which the retaining portions 72 forming the retaining protrusions are formed, differs slightly from the blade 60 previously described, in that these retaining portions 72 are connected to its fastening portion 70A by steps 70B extended radially outwardly by ears 70C protruding radially. These ears are made simply by a fold of the transverse blade. As seen in FIG. 5, the angular spacing of the ears 70C is adapted so that, in the pre-assembled state, the ears extend between the two retaining fingers 40 and are retained by their pins 42 on the front edges of the retaining portions 72. This allows ensuring the angular wedging of the second tube relative to the clamping system.

The shaping of the transverse blade 60 or 70 allows a particularly effective pre-assembly. Indeed, as indicated, the thickness of the blade is oriented radially while its width is oriented axially. The retaining fingers are retained on the front edge of the retaining portions of this blade, that is to say the edges that are furthest from the free end of the first tube. Any forces to detach the first tube from the locking system operate parallel to the width of the transverse blade. It is therefore a direction in which this blade is unlikely to be deformed. Thus, the pre-assembly is particularly effective. The ears 70C of the blade 70 form shoulders in the form of a radial stop for the retaining fingers 40.

For the mounting of the assembly comprising the two tubes and the clamping system, the free end of the tube 4 is first engaged in the annular space arranged between the washer 28 and the second flank 13B of the belt so as to pre-mount the clamping system around this free end, then the free end of the tube 2 in the clamping system is engaged, until reaching the position represented in FIGS. 3 and 5.

The centering surfaces allow, during the fitting of the first tube into the clamping system, cooperating with the top of the clamping surface of this first tube to center it relative to the clamping system. This promotes the correct pre-mounting of the clamping system on the first tube and therefore the centering of the two tubes relative to each other. The centering surfaces can be formed on the retaining finger(s), by being possibly completed by one or several centering surfaces formed on the centering fingers if they are provided. The retaining edge of the retaining finger can be made in a very simple manner by a simple partial cutout in this finger releasing a tab which is folded back to form a pin 42 folded radially inwardly. This pin is very simple to manufacture, without addition of material, while forming an effective claw so that the retaining finger grips on the radially protruding element on the external periphery of the first tube.

FIG. 6A schematically represents the first tube 2, the second tube 4, the belt 12 of the collar, the washer 28 and the transverse blade 40. The frustoconical portion 30 of the washer 28 is located between the internal face of the bearing surface 20 of the second tube 4 and the external face of the frustoconical end part 23 of the first tube 2. The clamping system is, on the one hand, pre-mounted on the second tube 4, pre-mounting lugs 34 of the washer hooking on the one hand the washer on the belt 12 of the collar and on the other hand bearing on the external face of the clamping surface 20. On the other hand, the clamping system is also pre-mounted on the first tube, the retaining finger 40 being retained on the retaining portion 72 of the blade 70, the pin 42 being retained against the front edge of the retaining portion. In this example, as in that of the previous figures, the finger passes radially above the retaining portion 72 until hooking against its front edge.

FIG. 6B illustrates a variant, which differs from that of FIG. 6A by the fact that the retaining finger 40' passes radially under the retaining portion, which in this case is similar to the retaining portion 62. Indeed, the retaining finger 40' extends axially forwardly from the frustoconical portion 30 of the washer while remaining in diametrical dimensions which allow it to pass radially under the retaining portion 62 during insertion of the end of tube 2 in the clamping system. Thus, the retaining pin 42' of the finger 42, which is directed radially outwardly, can hook on the front edge of the retaining portion 62. The ramp 49' formed at the free end of the finger 40' is directed inwardly. The retaining finger 40' may also be similar to the retaining finger 40 of the previous figures and, particularly, have a centering surface and a reinforcing rib.

As indicated, the retaining protrusion can be formed on a transverse blade fastened to the first tube. This blade is a geometric element which is very simple and therefore easy to manufacture. Its fastening can however be extremely resistant because of the possible contact surface between the first tube and this blade. The transverse orientation of this blade promotes effective retention because the possible detachment forces operate axially, therefore perpendicularly to the main direction of the blade, direction in which this blade is not very deformable.

The clamping belt and the washer as well as the fingers are preferably made of metal. Concerning particularly the washer, this can be made in a stainless steel strap of the austenitic type, and having particularly a thickness comprised between 0.1 mm and 0.5 mm, or even between 0.2 and 0.4 mm.

The invention claimed is:

1. A clamping system for connecting a first and a second tube whose opposite ends have clamping surfaces protruding from a cylindrical outer surface of said tubes, the clamping system comprising a collar which comprises a belt able to be clamped around said clamping surfaces, the belt having a first and a second flank between which an internal recess able to receive the clamping surfaces is delimited, the collar carrying at least one retaining finger, which has a free end portion protruding axially beyond an edge of the first flank, said free end portion having a retaining edge configured to be retained outside the belt by a radially protruding element, wherein the clamping system comprises centering surfaces located axially outside the edge of the first flank.

2. The clamping system according to claim 1, wherein the centering surfaces comprise at least one centering surface formed on the retaining finger.

3. The clamping system according to claim 1, wherein the collar carries at least one centering finger protruding axially beyond the edge of the first flank and wherein the centering surfaces comprise at least one centering surface formed on the centering finger.

4. The clamping system according to claim 3, wherein the centering finger has a ramp at an end of a free end portion thereof.

5. The clamping system according to claim 3, wherein the centering finger has at least one reinforcing rib.

6. The clamping system according to claim 3, comprising a washer supported by the collar, the washer comprising an annular part disposed inside the belt and carrying the retaining finger and at least one centering finger protruding axially beyond the edge of the first flank and wherein the centering surfaces comprise at least one centering surface formed on the centering finger.

7. The clamping system according to claim 1, wherein the retaining finger has a ramp at an end of the free end portion thereof.

8. The clamping system according to claim 1, wherein the retaining finger has at least one reinforcing rib.

9. The clamping system according to claim 1, comprising a washer supported by the collar, the washer comprising an annular part disposed inside the belt and carrying the retaining finger.

10. The clamping system according to claim 1, wherein the retaining edge is formed on a pin cut out in the retaining finger and deformed radially.

11. An assembly comprising a clamping system and a first tube, the first tube presenting a clamping surface arranged in a vicinity of a free end thereof and protruding from a cylindrical outer surface of the first tube, and the first tube further having a retaining protrusion located on the other side of the clamping surface relative to the free end, the clamping system comprising a collar which comprises a belt able to be clamped around the clamping surface, the belt having a first and a second flank between which an internal recess able to receive the clamping surface is delimited, the collar carrying at least one retaining finger, which has a free end portion protruding axially beyond an edge of the first flank, said free end portion having a retaining edge configured to be retained outside the belt by the retaining protrusion in a condition in which the first tube is fitted into the collar, wherein the retaining protrusion is formed on a transverse blade which has a fastening portion through which it is fastened to the first tube, and two retaining portions straightened radially relative to the fastening portion, and wherein the collar carries two retaining fingers configured to cooperate with said retaining portions.

12. The assembly according to claim 11, wherein the retaining protrusion is configured to define an angular wedging of the clamping system relative to the first tube.

13. The assembly according to claim 12, wherein the transverse blade has two shoulders forming a radial stop for the retaining fingers carried by the collar and configured to cooperate with said retaining portions.

14. A clamping system for connecting a first and a second tube whose opposite ends have clamping surfaces protruding from a cylindrical outer surface of said tubes, the clamping system comprising a collar which comprises a belt able to be clamped around said clamping surfaces, the belt having a first and a second flank between which an internal recess able to receive the clamping surfaces is delimited, the collar carrying at least one retaining finger, which has a free end portion protruding axially beyond an edge of the first flank, said free end portion having a retaining edge configured to be retained outside the belt by a radially protruding element, the retaining edge being formed on a pin cut out in the retaining finger and deformed radially.

15. An assembly comprising a clamping system and a first tube, the first tube presenting a clamping surface arranged in a vicinity of a free end thereof and protruding from a cylindrical outer surface of the first tube, and the first tube further having a retaining protrusion located on the other side of the clamping surface relative to the free end, the clamping system comprising a collar which comprises a belt able to be clamped around the clamping surface, the belt having a first and a second flank between which an internal recess able to receive the clamping surface is delimited, the collar carrying at least two retaining fingers, which have free end portions protruding axially beyond an edge of the first flank, the retaining protrusion having two shoulders forming respective radial stops for the retaining fingers collar and configured to cooperate with respective retaining edges formed on the free end portions of the retaining fingers in a condition in which the first tube is fitted into the collar.

* * * * *